(12) United States Patent
Gustafsson (10) Patent No.: US 6,615,943 B1
(45) Date of Patent: Sep. 9, 2003

(54) SPEED ADJUSTING SYSTEM, CONTROL, UNIT FOR SUCH A SYSTEM AND METHOD FOR ADJUSTING THE SPEED OF A VEHICLE

(75) Inventor: Sven Gustafsson, Lund (SE)

(73) Assignee: Nomix AB, Lund (SE)

( * ) Notice: Subject to any disclaimer, the term of this patent is extended or adjusted under 35 U.S.C. 154(b) by 0 days.

(21) Appl. No.: 09/937,327
(22) PCT Filed: Mar. 24, 2000
(86) PCT No.: PCT/SE00/00581
§ 371 (c)(1),
(2), (4) Date: Sep. 24, 2001
(87) PCT Pub. No.: WO00/56566
PCT Pub. Date: Sep. 28, 2000

(30) Foreign Application Priority Data

Mar. 24, 1999 (SE) ................................................ 9901082

(51) Int. Cl.$^7$ ............................................. B60K 31/00
(52) U.S. Cl. ........................ 180/170; 180/171; 180/168
(58) Field of Search ................................ 180/170, 171, 180/172, 173, 175, 176, 178, 179, 167, 168, 169, 6.5; 123/352, 339.17

(56) References Cited

U.S. PATENT DOCUMENTS

| | | | | |
|---|---|---|---|---|
| 3,207,255 A | * | 9/1965 | Hahlganss et al. | 180/179 |
| 3,476,204 A | * | 11/1969 | Westby et al. | 180/178 |
| 3,485,316 A | * | 12/1969 | Slavin et al. | 180/176 |
| 3,866,102 A | * | 2/1975 | Hashimoto et al. | 180/6.5 |
| 3,985,195 A | * | 10/1976 | Tixier | 180/168 |
| 4,166,514 A | * | 9/1979 | de Freminville et al. | 180/167 |
| 4,224,907 A | * | 9/1980 | Lefeuvre et al. | 123/352 |
| 4,367,805 A | * | 1/1983 | Totani et al. | 180/179 |
| 4,546,744 A | * | 10/1985 | Bonfiglioli | 123/339.17 |
| 4,656,407 A | * | 4/1987 | Burney | 180/178 |
| 4,771,847 A | * | 9/1988 | Michell | 180/179 |
| 5,161,633 A | * | 11/1992 | Torrielli et al. | 180/170 |
| 5,485,161 A | | 1/1996 | Vaughn | |
| 5,568,797 A | | 10/1996 | Landerretche | |
| 5,713,428 A | * | 2/1998 | Linden et al. | 180/179 |
| 5,731,977 A | * | 3/1998 | Taniguchi et al. | 180/169 |

FOREIGN PATENT DOCUMENTS

| | | |
|---|---|---|
| DE | DT 24 44 518 A1 | 4/1976 |
| DE | 28 36 342 A1 | 2/1980 |
| DE | 196 38 900 A1 | 3/1998 |
| DE | 197 01 432 A1 | 7/1998 |
| EP | 0 709 245 A1 | 5/1996 |
| GB | 1477 870 | 7/1977 |

* cited by examiner

Primary Examiner—Brian L. Johnson
Assistant Examiner—Hau Phan
(74) Attorney, Agent, or Firm—Burns, Doane, Swecker & Mathis, L.L.P.

(57) ABSTRACT

A speed adjusting system for vehicles includes an accelerator, such as a throttle pedal, a speed adjusting device, such as a throttle or a fuel injection pump, which is adjustable by operating the accelerator, and a control unit which is connected to the accelerator and which is settable between a first operating position, in which the accelerator is operable without difficulty, and a second operating position, in which the accelerator is operable with difficulty. The second operating position constitutes a basic state of the control unit, the difficulty, with which the accelerator is operable when the control unit is arranged in the basic state, appearing as a resistance which is generated by the control unit and acts on the accelerator and which must be overcome for operating the accelerator and which clearly exceeds the resistance that exists for operating a conventional accelerator. The control unit comprises a drive, the drive, on activation, being adapted to counteract the resistance, which control unit will thus be arranged in its first operating position by activating the drive. The invention also relates to a control-unit which can be arranged in such a system, and a method for adjusting the speed of a vehicle.

29 Claims, 4 Drawing Sheets

SPEED ADJUSTING SYSTEM, CONTROL, UNIT FOR SUCH A SYSTEM AND METHOD FOR ADJUSTING THE SPEED OF A VEHICLE

FIELD OF THE INVENTION

The present invention relates to a speed adjusting system, a control unit for such a system as well as a method for adjusting the speed of a vehicle. The invention relates more specifically to such a system comprising a gas adjusting means adjustable by means of an accelerator, a control unit for such a system and a method for adjusting the speed of a vehicle.

BACKGROUND ART

The speed limits prevailing on the roads aim at increasing road safety. Nevertheless it is common for vehicles to exceed the permissible speeds. It goes without saying that this is not satisfactory from the viewpoint of road safety.

For this reason, various systems have been developed to ensure that the prevailing speed limits are obeyed.

For example, German Published Application DE 19638900 discloses a system preferably for vehicles with diesel engines, said system comprising a speed limiting device which is activated in case a permissible speed is exceeded. The speed is adjusted by pressing an accelerator for controlling a pump for fuel injection to the engine. The speed limiting device is, on activation, arranged in such manner that, independently of the position of the accelerator, the pump adjusts the fuel injection so that the speed of the vehicle does not exceed the permissible speed.

Moreover, German Published Application DE 2836342 discloses a system for vehicles, which system comprises a speed limiting device which, in case a permissible speed is exceeded, is activated in such manner that a coupling rod arranged between an accelerator and a throttle is extended, thereby reducing the speed provided by pressing down the accelerator. When the speed of the vehicle has been reduced to the necessary extent, the rod is retracted, whereby the speed of the vehicle can again be adjusted by operating the accelerator.

When these prior-art systems are activated, it is thus not possible to increase or even maintain the current speed, which of course in some cases can be disadvantageous or even dangerous, such as in overhauling.

When the above-described prior-art systems for adjusting the speed of a vehicle to the permissible speed are activated, the driver thus loses his capability of controlling the speed. The driver's only way of avoiding this is to accurately observe on a speedometer the speed with which he drives his vehicle, and thereby ensure that this speed is at all times below the permissible speed.

A solution to this problem is disclosed in e.g. DE 2444518. The described system comprises a means for returning the accelerator, said means being activated if a permissible speed is exceeded. The accelerator can, however, still be pressed down, which requires an extra effort. It will thus be possible to drive the vehicle at a speed above the permissible maximum speed. However, the accelerator will be difficult to operate, which probably means that the driver chooses to lower the speed of the vehicle for the accelerator again to be easily operated.

Also the system according to DE 2444518 relates to a system which is not activated until a permissible speed has been exceeded. Thus, there is a need for a system which can be used to better promote the adjustment of the speed of a vehicle, i.e. a system which helps to ensure that the current speed limits are obeyed.

SUMMARY OF THE INVENTION

A first object of the present invention thus is to provide an improved system for adjusting the speed of a vehicle. The system should be designed so that it can be used to adjust the speed of a vehicle to a currently prevailing permissible maximum speed. More specifically, the system should promote such adaptation of the speed and at the same time allow driving of the vehicle at a speed exceeding the currently prevailing permissible maximum speed.

It is also advantageous if the system is designed in such manner that it draws the driver's attention to the speed which is the currently permissible maximum speed.

A second object of the present invention is to provide a device which can be arranged in a system for adjusting the speed of a vehicle, said device being designed so as to promote adaptation of the speed of the vehicle to the currently permissible maximum speed.

A third object of the present invention is to provide an improved method for adjusting the speed of a vehicle, said method promoting adaptation of the speed of the vehicle to the permissible speed while the driver of the vehicle has the possibility of choosing to drive his vehicle at a speed exceeding the currently permissible maximum speed.

More specifically, according to the invention a speed adjusting system for vehicles is provided, comprising an accelerator, such as a throttle pedal, a speed adjusting means, such as a throttle or a fuel injection pump, which is adjustable by operating the accelerator, and a control unit which is connected to the accelerator and which is settable between a first operating position, in which the accelerator is operable without difficulty and a second operating position, in which the accelerator is operable with difficulty, said system being characterised in that the second operating position is a basic state of the control unit, the difficulty, with which the accelerator is operable when the control unit is arranged in said basic state, appearing as a resistance which is generated by the control unit and acting on the accelerator and which must be overcome for operating the accelerator and which clearly exceeds the resistance that exists for operating a conventional accelerator, and that the control unit comprises a drive means, the drive means, on activation, being adapted to counteract said resistance, which control unit will thus be arranged in its first operating position through activation of the drive means.

Thus a system is provided, which can be used to promote adaptation of the speed of the vehicle so that a permissible maximum speed is not exceeded while the driver of the vehicle always has the possibility of driving his vehicle at the desired speed.

The control unit is suitably arranged in its first operating position for driving the vehicle at a speed which is lower than or corresponds to a currently prevailing permissible maximum speed and in its second operating position when exceeding said permissible maximum speed. Thus, a system is provided, which when exceeding a permissible maximum speed makes the accelerator difficult to operate. The driver can choose either to reduce the speed, in which case the control unit is arranged in its first operating position when the speed falls below the permissible speed-which makes the accelerator once more easy to operate-or to maintain or even increase the speed, in which case the control unit will remain in its second operating position-whereby the accelerator remains difficult to operate. The system thus is satisfactory in terms of road safety since the driver all the time keeps control of the vehicle. At the same time it is, of course, most favourable for the driver to drive the vehicle at a permissible speed since this makes the accelerator easier to operate.

A particularly advantageous effect obtained in the inventive system is that the driver's attention is at all times attracted to the speed which is the permissible maximum speed. This is achieved by the driver, when operating the accelerator, senses a final position of the accelerator, in which final position the throttle pedal will be stiff to operate. It will thus be extremely simple for the driver to drive the vehicle at the permissible speed by always seeing to it that the accelerator is never moved past said final position. The final position is provided by the drive means, which in the first operating position of the control unit counteracts the resistance acting on the accelerator. Thus the drive means will assist in operating the accelerator as long as the control unit is arranged in its first operating position. This assistance ceases immediately when the control unit is arranged in its second operating position, which, as mentioned above, suitably corresponds to the driving of the vehicle at a speed exceeding the permissible maximum speed. Operation of the accelerator with assistance is thus allowed to a certain extent. Continued operation thus occurs without assistance and requires an increased effort. Consequently the permissible maximum speed will be clearly perceptible to the driver in the form of a final position when operating the accelerator.

The inventive system will also be extremely reliable and safe. In case of damage or malfunction in the system, the only consequence will be that the control unit is arranged in its non-activated basic state corresponding to the second operating position. The accelerator will thus be difficult to operate in case of malfunction. This eliminates the risk of locking the accelerator to a nondesirable extent.

Preferably, the control unit is arranged for gradual setting from one of the first and the second operating position to the other of the first and the second operating position.

Preferably the system comprises a controller, which is adapted to receive information about the speed of the vehicle and the current speed-limit regulations from a monitoring system; and to control the control unit on the basis of the information received from the monitoring system.

According to a preferred embodiment of the system, the control unit is also connected to the speed adjusting means, the control unit being arranged in such manner that the speed adjusting means is adjustable via the control unit by operating the accelerator.

Moreover, according to the present invention, a control unit is provided for adjusting the speed of a vehicle, comprising a first arm turnable by means of an accelerator, a second turnable arm, and a third arm turnable with the aid of a drive means, said first arm being spring loaded in such manner that, for turning thereof, a first force must be applied thereto, and said second arm being spring loaded in such manner that, for turning thereof, a second force must be applied thereto, the first arm, after turning through an angle, being arranged for engagement with and co-turning of the second arm, whereby, for turning of the second arm by operating the accelerator, this must be operated by applying a force corresponding to the sum of the first force and the second force, the third arm, on turning, being arranged for engagement with and co-turning of the second arm and the drive means, on activation, being arranged for such turning of the third arm and, thus, also of the second arm that the angle between the first arm and the second arm is maintained upon turning of the first arm.

As a result a control unit is provided, which is extremely suitable for use in a system according to the present invention. When the drive means is activated, a turning, caused by e.g. a throttle pedal, of the first arm will cause a suitable turning of the second arm for maintaining the angle between the arms. The first arm will thus not engage with the second arm, whereby the throttle pedal need only be operated with the first force for adjusting the speed. When the drive means is switched off or deactivated, said angle will not be maintained, and thus the throttle pedal must be subjected to a force corresponding to the sum of the first and the second force. By seeing to it that this sum is sufficient, it is possible to ensure that the operation of the throttle pedal will be difficult. It is thus suitable to arrange the control unit in such manner that it is switched off in case the speed is exceeded, thereby promoting driving of the vehicle at a permissible speed.

The second arm of the 1control unit can be connected with a speed adjusting means, whereby the speed adjusting means can be adjusted by turning of the second arm.

Finally, according to the present invention a method is provided for controlling the speed of a vehicle, comprising the steps of arranging an accelerator in such manner that it can only be operated with difficulty to adjust a speed adjusting means, counteracting, by means of a control unit, said difficulty to such an extent that it is essentially eliminated, and ceasing, if the vehicle is driven at a speed exceeding a currently prevailing permissible maximum speed, to counteract said difficulty, whereby the exceeding of the speed is made evident to the driver of the vehicle in such manner that the accelerator can be operated only with difficulty to adjust the speed adjusting means.

BRIEF DESCRIPTION OF THE DRAWINGS

Preferred embodiments of the invention will now be described in more detail with reference to the accompanying drawings.

DESCRIPTION OF EMBODIMENTS

Figure 1:
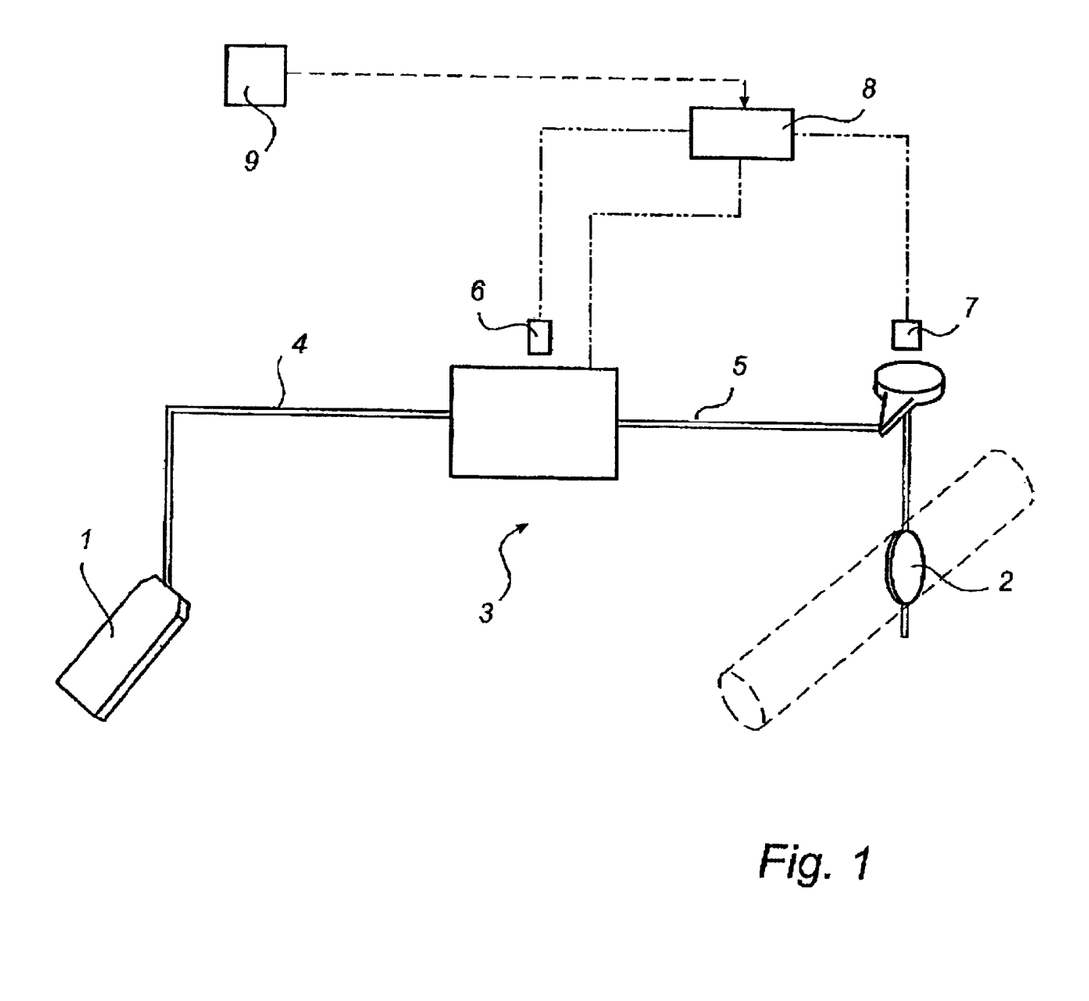
FIG. 1 is a schematic view of a system according to the invention.

FIG. 1 shows schematically the composition of a system according to a preferred embodiment of the present invention.

The system, which is intended to be arranged in a powered vehicle such as a car, comprises a control unit 3 connected between an accelerator, such as a throttle pedal 1, and a gas adjusting means, such as a throttle 2. The throttle pedal 1 is more specifically connected to the control unit 3 via a first connecting means in the form of a first wire 4 and the throttle 2 is connected to the control unit 3 via a second connecting means in the form of a second wire 5.

A first transducer means in the form of a transducer 6 of electromagnetic type acting in a contactless manner is arranged adjacent to the control unit 3 for reading an angular position which is provided by means of the throttle pedal 1 and corresponds to the desired adjustment of the speed. Moreover, a second transducer means in the form of a transducer 7 of electromagnetic type acting in a contactless manner is arranged adjacent to the throttle 2 for reading its angular position corresponding to the actual speed adjustment.

Finally, a controller 8 is arranged for controlling the control unit 3 in the manner described below. The controller 8 is also adapted to receive information about the speed of the vehicle and the prevailing speed limits from a monitoring system 9.

The control unit 3, which will be described more clearly below, is settable between a first and a second operating position.

The first operating position, which is taken on activation of the control unit 3, is arranged in such manner that the degree of opening of the throttle 2 can easily be controlled by operating the throttle pedal 1.

More specifically, the throttle pedal 1 need only be operated with a force necessary for operating a conventional throttle pedal, normally 30–50 N.

The second operating position, which is taken when the control unit 3 is not activated and which thus constitutes the basic state of the control unit 3, is arranged in such manner that the degree of opening of the throttle 2 can only with difficulty be adjusted by operating the throttle pedal 1. When the control unit 3 is arranged in this second operating position, it is thus difficult for the driver of the vehicle to increase the speed. The required force can be varied in the range 80–120 N.

The control unit 3 is thus arranged in such manner that it assists the operation of the throttle pedal 1 when said control unit 3 is arranged in its first operating position and does not assist said operation when it is arranged in its second operating position.

In a vehicle equipped with such an inventive system, the controller 8 thus receives relevant information regarding the speed of the vehicle and the prevailing speed limits from the monitoring system 9. If the speed of the vehicle is below the permissible speed, the controller 8 activates the control unit 3, which is thus arranged in its first operating position, in which the throttle pedal 1 can be operated without difficulty for adjusting the opening degree of the throttle 2. Should the vehicle be driven at a speed exceeding the permissible speed, the controller 8 switches off or deactivates the control unit 3, whereby the driver's attention is attracted to the exceeding of the speed by the throttle pedal 1 being difficult to operate. Then the driver may choose either to continue to drive the vehicle at an impermissible speed-although with difficulty since the throttle pedal 1 is then difficult to operate-or to release the throttle pedal 1 until the permissible speed is not exceeded, whereby the control unit 3 is again activated by the controller 8 and the throttle pedal 1 will be easy to operate.

It should, however, be noted that the inventive system promotes the driving of the vehicle at a speed below the permissible maximum speed in such a manner that the speed limit need never be exceeded. In fact the system works in such manner that the driver continuously via the throttle pedal 1 senses the permissible maximum speed. When operating the throttle pedal 1, the driver will in fact feel a pressure point or a "final position" when pressing the throttle pedal 1. This "final position" corresponds to the adjustment of the speed which corresponds to the permissible maximum speed. In this final position, the control unit 3 thus ceases to assist the operation of the throttle pedal 1. In other words, the :driver will feel "the law in the throttle pedal" which promotes the driving of the vehicle at a speed that never exceeds the permissible maximum speed.

The control unit is preferably arranged for gradual passing between the two operating positions.

The above-mentioned monitoring system 9 may consist of, for example, a GPS-based satellite monitoring system which supplies information about the speed of the vehicle and the prevailing speed limit regulations to a receiver unit (not shown) in the controller 8, or of transmitters, which are mounted along the road and which supply information about the prevailing speed limit regulations to a similar receiver unit in the controller 8 of the vehicle.

In the latter case, the vehicle also comprises equipment for determining the speed with which the vehicle is driven.

Figure 2:
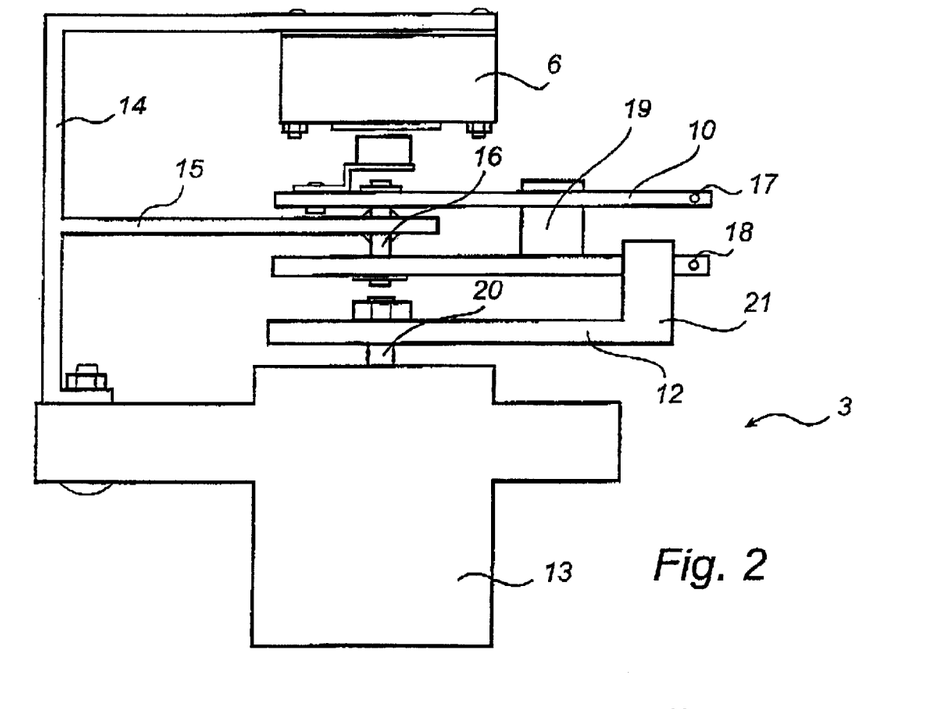
FIG. 2 is a side view of a first embodiment of a control unit for the inventive system.
Figure 3:
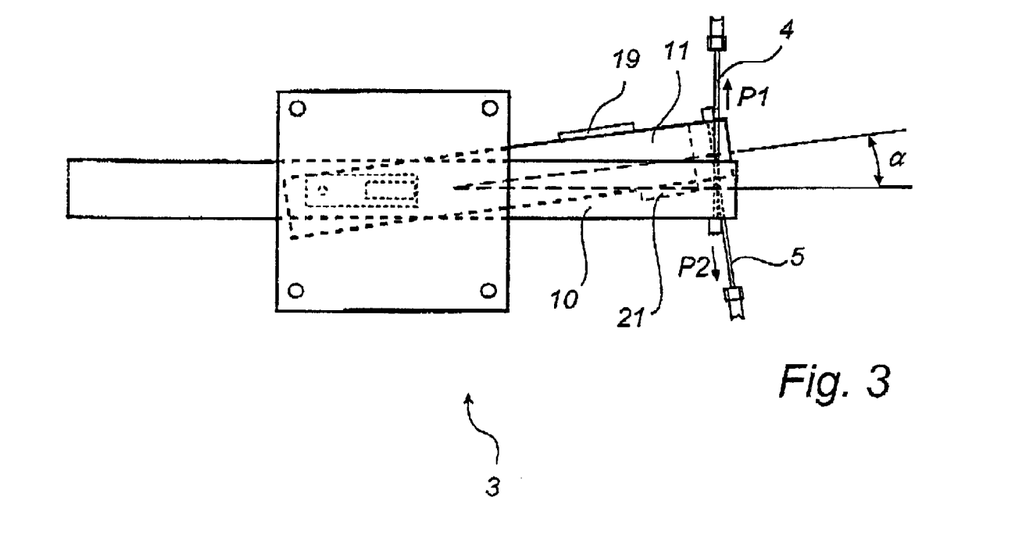
FIG. 3 is a top plan view of the control unit shown in FIG. 2.

A first preferred embodiment, which is shown in FIGS. 2 and 3 and to which reference is now made, of a control unit 3 according to the present invention comprises essentially three arms 10, 11,12 and a drive means in the form of an electric motor 13.

A holder 15 fixed to a frame 14 supports a shaft 16 in which the first arm 10 is turnably mounted. The first arm 10 is in a fixing point 17 connected to the throttle pedal 1 by means of a first wire 4, as shown in FIG. 1.

Said first arm 10 is spring loaded (not shown) in such manner that for turning thereof the throttle pedal 1 must be pressed down by applying a force corresponding to the force required for pressing down a conventional throttle pedal.

Also the second arm 11 is turnably mounted in the shaft 16. The second arm 11 is in a fixing point 18 connected to the throttle 2 by means of a second wire 5, as shown in FIG. 1, and is spring loaded (not shown) in such manner that for turning thereof a force must be applied thereto, which corresponds to or exceeds the force that is required for pressing down a conventional throttle pedal. The second arm 11 extends parallel with and under the first arm 10, which is evident from FIG. 2, and with a certain angular displacement a thereto, which is evident from FIG. 3. The second arm 11 further supports a lug 19 which extends upwards. The first arm 10 will, when turning about the shaft 16, by pressing down of the throttle pedal 1, after a certain degree of turning corresponding to said angular displacement a, engage with the lug 19 and thus turn along the second arm 11.

It is thus possible to control the degree of opening of the throttle 2 by operating the throttle pedal 1.

However it should be noted that in this case the throttle pedal 1 must be operated with a force that clearly exceeds the force required for operating a conventional throttle pedal, which thus depends on the fact that for turning the second arm 11 it is necessary to operate the throttle pedal 1 by applying the force that is required for jointly turning the first arm 10 and the second arm 11.

The electric motor 13, which is mounted in the frame 14, has a motor shaft 20, on which the third arm 12 is arranged. The third arm 12 is turnable by means of the motor 13 and extends under and parallel with the second arm 11.

The motor shaft 20 is concentrically arranged under the first shaft 16, whereby all arms 10,11,12 are turned about a common axis. A lug 21 is arranged on the third arm 12 and, on turning of the third arm 12, engages with and turns along the second arm 11. The degree of opening of the throttle 2 can thus be controlled by means of the motor 13.

The control unit 3 further comprises a transducer 6, which is adapted to read the angular position of the first arm 10.

When an inventive system comprising a control unit 3 in accordance with this first embodiment is arranged in a vehicle, the system operates as follows.

As long as the vehicle is driven with a speed below the permissible speed, which information as described above is transferred to the controller 8 from the monitoring system 9, the controller 8 provides for the electric motor 13 to be activated, whereby the control unit 3 thus takes its first operating position. A pressing-down of the throttle pedal 1 will cause a turning of the first arm 10, said turning being read as a desired value by the first transducer 6. The desired value, which thus indicates the desired adjustment of the speed, is transferred to the controller 8. A second transducer 7, which as shown in FIG. 1 is arranged adjacent to the throttle 2 reads the angular position of the throttle 2, which thus represents an actual value corresponding to the actual degree of opening of the throttle 2. It will be appreciated that said transducer 7 can be replaced by some other means, such as a pulse counter, which establishes the angular position of the electric motor 13, i.e. the turning of the second arm, which in turn controls the actual adjustment of the speed. Also the actual value is transferred to the controller 8, which compares the two values. The controller 8 then controls the motor 13 in such a way that it turns the third arm 12 and, thus, also the second arm 11 for adjusting the degree of opening of the throttle 2. When the actual value conforms with the desired value, the motor 13 interrupts the adjusting of the degree of opening of the throttle 2. It is consequently ensured that the angular displacement a between the first 10 and the second arm 11 is maintained. This ensures that the first arm 10, during turning, does not engage with the lug 19 of the second arm 11, and consequently the throttle pedal 1 need not be subjected to a force corresponding to the force required for turning the second arm 11. When driving the vehicle with a permissible speed, the driver of the vehicle will consequently not experience any difficulties whatever in operating the throttle pedal 1 since the adjustment of the degree of opening of the throttle 2—i.e. the turning of the second arm 11—is assisted by the electric motor 13.

If the speed of the vehicle exceeds the permissible speed, the controller 8 is adapted to deactivate the electric motor 13. In other words, the assistance provided by the electric motor 13 for adjusting the degree of opening of the throttle 2 will cease.

When the electric motor 13 is deactivated, the third arm 12 is adapted to return to a starting position, in which no adjustment of the speed is obtained. The second arm 11 will, as a consequence of its spring load, strive to return to the same starting position. The lug 19 sup ported by the second arm 11 will thus engage with the first arm 10 during this return motion. The driver will notice this as a resistance that is applied to the throttle pedal 1. The driver may choose either to release the throttle pedal 1, whereby the increase of the speed is throttled and the speed of the vehicle decreases, or to maintain or even increase the speed. In the latter case, the driver must operate the throttle pedal 1 by applying a force clearly exceeding the force required for operating a conventional throttle pedal. The driver will of course find this inconvenient, which means that in the normal case he will probably choose to lower the speed of the vehicle by releasing the throttle pedal 1. However, it is important to note that the driver can all the time choose how to proceed. There are in fact opportunities when it may be necessary to drive the vehicle with a nonpermissible speed, such as in overhauling.

If the driver chooses to release the throttle pedal 1, the controller 8, as soon as the speed of the vehicle has been adjusted to the permissible speed, will once more activate the electric motor 13, whereby the adjustment of the speed will again be assisted by the electric motor and consequently be comfortable to the driver.

It is worth noticing once more that the inventive system promotes the adaptation of the speed in such a manner that the permissible maximum speed need not be exceeded. As soon as the drive means in the form of the electric motor 13 is deactivated, the assistance provided by the electric motor 13 ceases. The operation of the throttle pedal 1 is thus to a certain extent allowed with assistance and, to an increased extent, without assistance. The limit position is very distinct. Immediately as the electric motor 13 is deactivated the assistance ceases. The driver will thus clearly feel in the throttle pedal 1 the position in which the assistance ceases. This results in a final position corresponding to the permissible maximum increase of the speed for driving the vehicle with the permissible maximum speed. To drive the vehicle at a speed not exceeding the permissible maximum speed, the driver can consequently operate the throttle pedal 1 so as to move it to said final position. The force with which the driver operates the throttle pedal 1 is thus adjusted so as not to exceed the force required to move the throttle pedal 1 past said final position.

The driver can then maintain the throttle pedal in said final position. The place of the final position may thus be changed depending on the road conditions. When driving uphill, an increased speed adjustment, i.e. further pressing of the throttle pedal, is required to maintain the same speed. The final position will thus be changed to allow the throttle pedal to be pressed, which means that throttle pedal 1 and thus also the driver's foot will automatically come along to the new final position.

The inverse condition applies when driving the vehicle downhill. The final position will be moved in order to accomplish a reduced speed adjustment, i.e. release of the throttle pedal, whereby the throttle pedal 1 and the driver's foot once more come along.

As is evident from FIG. 3, the first wire 4 is connected to the control unit 3 from a first side while the second wire 5 is connected to the control unit 3 from a second, opposite side. It may, however, in some cases be desirable for both wires 4,5 to be connected to the control unit 3 from one and the same side. The second preferred embodiment of the control unit 3 shown in FIGS. 4 and 5 allows such a connection of the wires 4,5.

Figure 4:
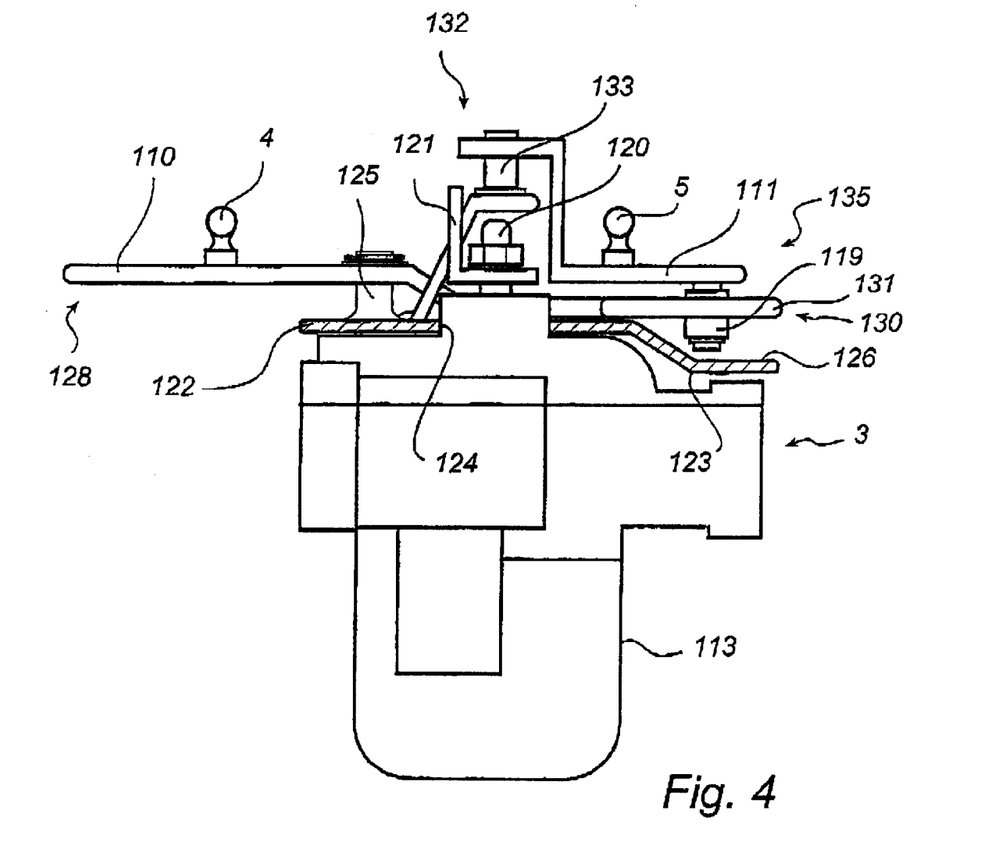
FIG. 4 is a side view of a second embodiment of a control unit for the inventive system.
Figure 5:
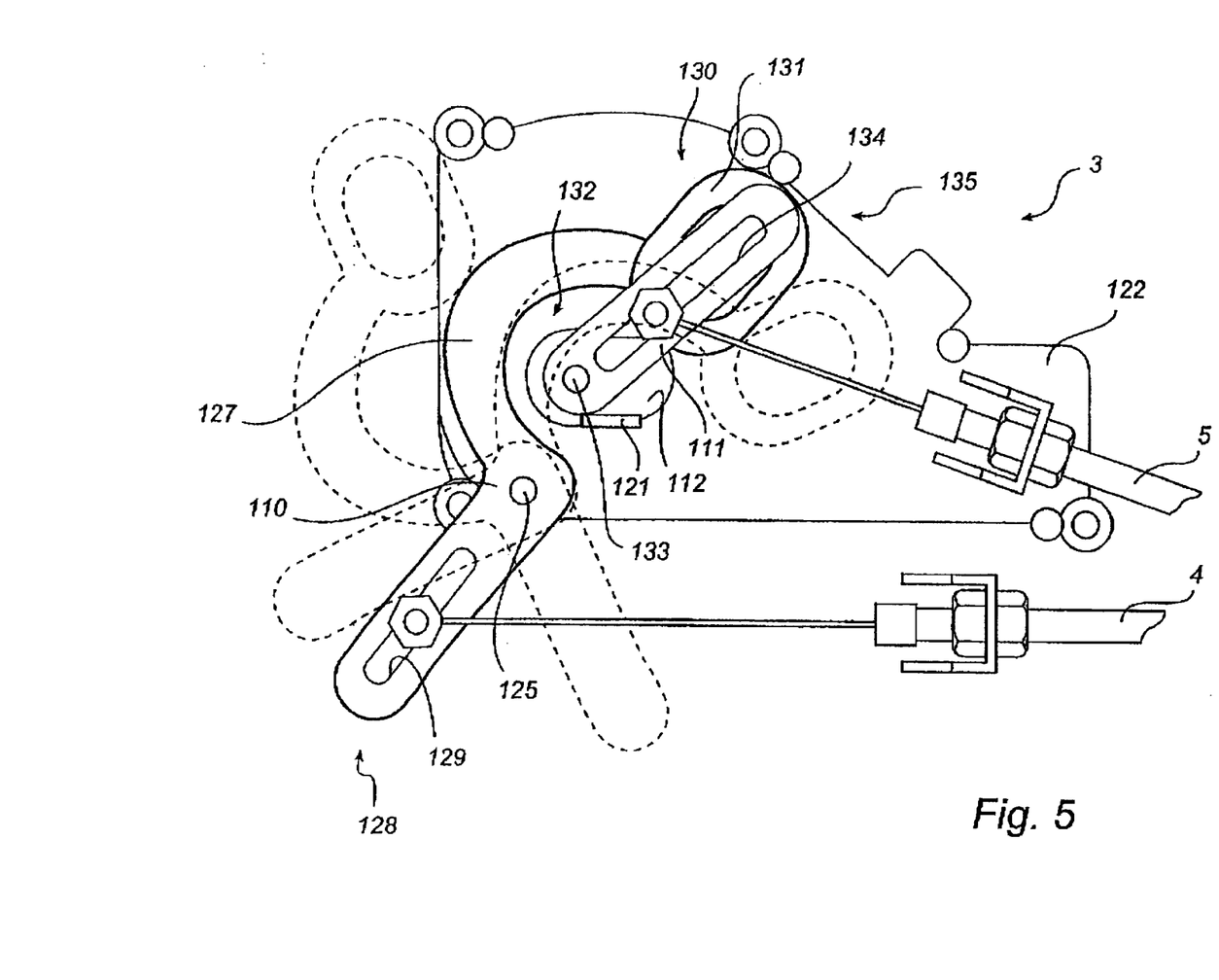
FIG. 5 is a top plan view of the control unit shown in FIG. 4.

Also this embodiment comprises essentially three arms 110, 111,112 and an electric motor 113, which are all mounted on a base plate 122.

The electric motor 113 is mounted on the underside 123 of the base plate 122 and comprises a motor shaft 120 which extends up through an opening 124 in the base plate 122.

The first arm 110 is turnably mounted in a first shaft 125 which is arranged on the upper side 126 of the base plate 122. The first arm 110 further comprises a curved portion 127, which is arranged outside the position, in which the motor shaft 120 projects on the upper side 126 of the base plate 122. A long hole 129 is formed at one end 128 of the first arm 110 for fixing the first wire 4. An engaging means in the form of an oval ring 131 is arranged at the opposite end 130 of the arm 110.

The second arm 111 is at one end 132 turnably mounted in a second shaft 133 which is concentric with the motor ner as in the first embodiment of the control unit 3. The essential difference is that the wires 4,5 are connected to the control unit 3 on the same side thereof. Moreover it is possible to exchange the turning of the second arm 111. In the example shown, an essentially 90 degree turning of the first arm 110 (said turning being effected by pressing down the throttle pedal 1) causes an essentially 120 degree turning of the second arm 111. The final positions of the first arm 110 are indicated by dashed lines.

This exchange is advantageous since the angular position through which the throttle pedal 1 is operable normally does not conform with the angular range through which the throttle 2 is adjustable.

A system is thus provided, which promotes driving of a vehicle with a permissible speed where the driver of the vehicle may nevertheless choose to drive the vehicle with a non-permissible speed if he desires so.

A developed road system which has a monitoring system and in which all vehicles have the inventive system for adjusting the speed can be used for efficient control of the traffic. If the monitoring system, for example, discovers a queue along a certain distance where the vehicles have come to a halt in several lanes, the system can reduce the permissible maximum speed a distance before said distance so that the queue has disappeared before vehicles behind said queue have reached the same.

This means that vehicles coming from behind do not have to stop, which is advantageous in environmental terms and also accelerates the dissolving of the queue. In fact the number of passing vehicles will be greater if the vehicles move continuously than in the case where every vehicle is forced to come to a halt repeatedly.

It will be appreciated that the present invention is not restricted to the embodiments illustrated.

The inventive system is, for example, possible to use in vehicles which do not comprise a speed adjusting means in the form of a throttle. Consequently it is possible to use, for example, the inventive system in vehicles with injection engines.

Nor is it necessary to connect the control unit to the speed adjusting means for adjusting the speed. In particular it is possible to adjust the speed by detecting the desired adjustment of the speed indicated by means of the accelerator and then, with a separate device, adjust the actual adjustment of the speed in the gas adjusting means in correspondence with the desired adjustment of the speed. The control unit is thus not used to adjust the speed. With reference to FIGS. 2 and 3, this is achieved most easily by the second arm 11 of the control unit 3 not being connected to the speed adjusting means 2. While driving the vehicle at a permissible speed, the electric motor 13 thus ensures that the first arm 10 when operating the throttle pedal 1 does not engage with the second arm 11, i.e. that the angle a between the first arm 10 and the second arm 11 is maintained. Should the permissible speed be exceeded, the electric motor 13 will be switched off, and it is thus not ensured that the angle a is maintained, which causes the first arm 10 to engage with the second arm 11, thus making it difficult to operate the throttle pedal 1. The turning of the second arm 11 is in this case thus not used to perform the adjustment of the speed adjusting means 2.

It is also possible to modify the control unit so that the second arm is turnable for increasing the speed independently of the first arm if the first arm is arranged in a non-actuated position, as shown in FIGS. 2 and 3. In the embodiment illustrated in FIGS. 4 and 5, this is achieved by designed the ring 131 so that it is not closed, but has a discontinuity, which allows the pin 119 to be removed from the ring during turning of the second arm for increasing the speed. This makes it possible to use the electric motor in the control unit as cruise control.

Consequently several modifications and variations are thus possible and the scope of the invention is thus ly defined by the accompanying claims.

What is claimed is:

1. A speed adjusting system for vehicles, comprising
an accelerator,
a speed adjusting means, which is adjustable by operating the accelerator, and
a control unit which is connected to the accelerator and which is settable between
a first operating position, in which the accelerator is operable upon application of a first accelerator force to the accelerator, and
a second operating position, in which the accelerator is operable upon application of a second accelerator force to the accelerator that is greater than the first accelerator force, wherein
a difference between the first accelerator force and the second accelerator force under which the accelerator is operable including a resistance which is generated by the control unit and acts on the accelerator and
the control unit comprises a drive,
the drive, on activation, being adapted to counteract the resistance, the control unit being arranged in the first operating position by activating the drive.

2. A system as claimed in claim 1, wherein the control unit is arranged in the first operating position for driving the vehicle no faster than a first speed and in the second operating position when exceeding the first speed.

3. A system as claimed in claim 2, wherein the control unit transitions from one of the first and the second operating position to the other of the first and the second operating position over a non-zero time period.

4. A system as claimed in claim 1, wherein the control unit transitions from one of the first and the second operating position to the other of the first and the second operating position over a non-zero time period.

5. A system as claimed in claim 1, further comprising a controller adapted to receive information about the speed of the vehicle and currently prevailing speed-limit regulations from a monitoring system and to control the control unit on the basis of the information received from the monitoring system.

6. A system as claimed in claim 1, wherein the control unit comprises a first turnable arm connected to the accelerator and which is turnable by operating the accelerator, and a second turnable arm, the first arm being turnable under a first arm force, and the second arm being being turnable under a second arm force.

7. A system as claimed in claim 5, wherein the first arm, after turning through an angle, adapted to engage and turn with the second arm upon application of the second accelerator force, the second accelerator force corresponding to a sum of the first arm force and the second arm force.

8. A system as claimed in claim 6, wherein the control unit comprises a third arm which is turnable by the drive and which is adapted to engage and turn with the second arm.

9. A system as claimed in claim 8, wherein the drive is adapted respond to turning of the first arm effected by operation of the accelerator to turn the third arm, to turn the second arm when the drive is activated.

10. A system as claimed in claim 9, comprising a first transducer for reading the desired speed adjustment obtained by operation of the accelerator.

11. A system as claimed in claim 10, wherein the first transducer is adapted to read the desired speed adjustment by detecting an angular position of the first arm.

12. A system as claimed in claim 11, wherein the first transducer is adapted to determine the angular position of the first arm without contacting the first arm.

13. A system as claimed in claim 11, comprising a second transducer for reading an actual speed adjustment obtained by adjusting the speed adjusting means.

14. A system as claimed in claim 10, wherein the first transducer is adapted to determine the angular position of the first arm without contacting the first arm.

15. A system as claimed in claim 10, comprising a second transducer for reading an actual speed adjustment obtained by adjusting the speed adjusting means.

16. A system as claimed in claim 15, wherein the second transducer is adapted to read the actual speed adjustment by detecting an angular position of the speed adjusting means.

17. A system as claimed in claim 15, wherein the second transducer is adapted to detect the angular position of the speed adjusting means without contacting the speed adjusting means.

18. A system as claimed in claim 17, wherein, when the drive is activated, the drive is adapted to turn the second arm until the actual speed adjustment read by the second transducer conforms with the desired speed adjustment read by the first transducer.

19. A system as claimed in claim 15, wherein, when the drive is activated, the drive is adapted to turn the second arm until the actual speed adjustment read by the second transducer conforms with the desired speed adjustment read by the first transducer.

20. A system as claimed in claim 16, wherein the second transducer is adapted to detect the angular position of the speed adjusting means without contacting the speed adjusting means.

21. A system as claimed in claim 16, wherein, when the drive is activated, the drive is adapted to turn the second arm until the actual speed adjustment read by the second transducer conforms with the desired speed adjustment read by the first transducer.

22. A system as claimed in claim 14, comprising a second transducer for reading an actual speed adjustment obtained by adjusting the speed adjusting means.

23. A system as claimed in claim 7, wherein the control unit comprises a third arm which is turnable by the drive means and which is adapted to engage and turn with the second arm.

24. A system as claimed in claim 1, wherein the control unit is connected to the speed adjusting means and the speed adjusting means is adjustable via the control unit by operating the accelerator.

25. A system as claimed in claim 24, wherein the speed adjusting means is connected to the control unit via connecting means.

26. A system as claimed in claim 25, wherein the speed adjusting means is connected to the second arm via the connecting means, and the second arm, is adapted to turn to adjust the speed adjusting means.

27. A control unit for adjusting the speed of a vehicle, comprising a first arm which is turnable by operation of an accelerator, a second turnable arm, and a third arm turnable with the aid of a drive, the first arm being spring loaded so that, for turning thereof, a first force must be applied thereto, and the second arm being spring loaded in such manner that, for turning thereof, a second force must be applied thereto, the first arm, after turning through an angle, being arranged for engagement with and turning of the second arm such that turning of the second arm by operating the accelerator requires application to the first arm of a force corresponding to the sum of the first force and the second force, the third arm being adapted to turn and engage with and turn the second arm and the drive being adapted to turn the third arm such that, when the third arm turns the second arm, an angle between the first arm and the second arm is maintained during turning of the first arm.

28. A control unit as claimed in claim 27, wherein the second arm, on turning, is adapted to adjust the speed of a vehicle.

29. A method for adjusting the speed of a vehicle, comprising the steps of providing speed adjusting means of a vehicle, the speed adjusting means being adapted to resist adjustment with a first force when the vehicle is operated at a speed no faster than a first speed and the speed adjusting means being adapted to resist adjustment with a second force greater than the first force when the vehicle is operated at a speed above the first speed;

adjusting the speed adjusting means by operating an accelerator;

counteracting a difference between the first force and the second force when the speed of the vehicle is no faster than the first speed; and ceasing to counteract the difference between the first force and the second force when the speed of the vehicle exceeds the first speed.

\* \* \* \* \*